United States Patent
Seol et al.

(10) Patent No.: US 9,929,791 B2
(45) Date of Patent: *Mar. 27, 2018

(54) COMMUNICATION METHOD AND APPARATUS USING ANALOG AND DIGITAL HYBRID BEAMFORMING

(71) Applicant: Samsung Electronics Co., Ltd., Suwon-si, Gyeonggi-do (KR)

(72) Inventors: Ji-Yun Seol, Seongnam-si (KR); Tae-Young Kim, Seongnam-si (KR); Jeong-Ho Park, Seoul (KR); Jae-Weon Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/163,305

(22) Filed: May 24, 2016

(65) Prior Publication Data

US 2016/0269093 A1  Sep. 15, 2016

Related U.S. Application Data

(63) Continuation of application No. 13/892,044, filed on May 10, 2013, now Pat. No. 9,362,994.

(30) Foreign Application Priority Data

May 10, 2012 (KR) .................. 10-2012-0049920
Aug. 29, 2012 (KR) .................. 10-2012-0094630

(51) Int. Cl.
*H04B 7/02* (2017.01)
*H04B 7/08* (2006.01)
(Continued)

(52) U.S. Cl.
CPC ............. *H04B 7/088* (2013.01); *H04B 7/043* (2013.01); *H04B 7/0456* (2013.01);
(Continued)

(58) Field of Classification Search
CPC .... H04B 7/0695; H04B 7/0639; H04B 7/088; H04B 7/0617; H04B 7/0632; H04L 25/03898; H04W 72/0413; H04W 72/046
See application file for complete search history.

(56) References Cited

U.S. PATENT DOCUMENTS 7,151,951 B2  12/2006  Goransson et al.
8,199,840 B2  6/2012  Zangi et al.
(Continued)

FOREIGN PATENT DOCUMENTS

CN  101124734 A  2/2008
CN  102084708 A  6/2011
(Continued)

*Primary Examiner* — Khanh C Tran
(74) *Attorney, Agent, or Firm* — Jefferson IP Law, LLP

(57) ABSTRACT

A communication method and apparatus using analog and digital hybrid beamforming are provided. The method includes receiving a first message including a measurement and selection condition for hybrid beamforming from a Base Station (BS), measuring channels of a plurality of BS transmission beams, selecting at least one BS transmission beam based on channel measurements, transmitting report information about the selected at least one BS transmission beam to the BS, receiving from the BS a second message, estimating an effective channel matrix for the selected final BS transmission beam according to the measurement and report condition, determining feedback information for digital beamforming of the BS based on the effective channel matrix, transmitting the determined feedback information to the BS, and receiving a data burst from the BS according to
(Continued)

a Multiple Input Multiple Output (MIMO) mode and/or a configuration scheduled based on the feedback information.

22 Claims, 11 Drawing Sheets

(51) Int. Cl.
 *H04B 7/04* (2017.01)
 *H04B 7/0456* (2017.01)
 *H04B 7/06* (2006.01)

(52) U.S. Cl.
 CPC ......... *H04B 7/0617* (2013.01); *H04B 7/0632* (2013.01); *H04B 7/0695* (2013.01); *H04B 7/0469* (2013.01); *H04B 7/063* (2013.01); *H04B 7/0639* (2013.01)

(56) References Cited

U.S. PATENT DOCUMENTS

| | | | |
|---|---|---|---|
| 8,208,566 B2 | 6/2012 | Lee et al. | |
| 8,274,937 B2 | 9/2012 | Tsai | |
| 8,619,886 B2* | 12/2013 | Nsenga | H04B 7/0617 |
| | | | 375/260 |
| 8,675,508 B2 | 3/2014 | Baker et al. | |
| 8,831,654 B2 | 9/2014 | Kim et al. | |
| 8,867,495 B2* | 10/2014 | Farajidana | H04B 7/0417 |
| | | | 370/252 |
| 8,873,484 B1 | 10/2014 | Lee et al. | |
| 8,934,328 B2 | 1/2015 | Shapira et al. | |
| 9,225,404 B2* | 12/2015 | Shirani-Mehr | H04L 5/0085 |
| 2004/0242156 A1* | 12/2004 | Tiirola | H04B 7/005 |
| | | | 455/25 |
| 2007/0165736 A1 | 7/2007 | Wang et al. | |
| 2008/0043874 A1 | 2/2008 | Lee et al. | |
| 2008/0192811 A1 | 8/2008 | Son | |
| 2008/0205260 A1 | 8/2008 | Lee et al. | |
| 2009/0322613 A1 | 12/2009 | Bala et al. | |
| 2010/0238824 A1 | 9/2010 | Farajidana et al. | |
| 2011/0164668 A1 | 7/2011 | Hoek et al. | |
| 2011/0291891 A1 | 12/2011 | Nsenga et al. | |
| 2012/0086602 A1 | 4/2012 | Park et al. | |
| 2012/0106346 A1 | 5/2012 | Aguirre et al. | |
| 2012/0230380 A1 | 9/2012 | Keusgen et al. | |
| 2013/0021925 A1* | 1/2013 | Yin | H04B 7/024 |
| | | | 370/252 |
| 2013/0257655 A1 | 10/2013 | Hu et al. | |
| 2015/0103934 A1* | 4/2015 | Nam | H04B 7/0413 |
| | | | 375/260 |
| 2016/0021548 A1* | 1/2016 | Raghavan | H04W 16/28 |
| | | | 370/329 |
| 2016/0080051 A1* | 3/2016 | Sajadieh | H04B 7/0456 |
| | | | 375/267 |

FOREIGN PATENT DOCUMENTS

| | | |
|---|---|---|
| EP | 2 166 808 A1 | 3/2010 |
| WO | 2006/088984 A2 | 8/2006 |

\* cited by examiner

COMMUNICATION METHOD AND APPARATUS USING ANALOG AND DIGITAL HYBRID BEAMFORMING

PRIORITY

This application is a continuation application of prior application Ser. No. 13/892,044, filed on May 10, 2013, which claimed the benefit under 35 U.S.C. § 119(a) of a Korean patent application filed on May 10, 2012 in the Korean Intellectual Property Office and assigned Serial No. 10-2012-0049920 and of a Korean patent application filed on Aug. 29, 2012 in the Korean Intellectual Property Office and assigned Serial No. 10-2012-0094630, the entire disclosure of each of which is hereby incorporated by reference.

BACKGROUND OF THE INVENTION

1. Field of the Invention

The present invention relates to a beamforming-based wireless mobile communication system. More particularly, the present invention relates to a communication method and apparatus using analog and digital hybrid beamforming.

2. Description of the Related Art

The development trend of wireless communication systems is toward higher data rates to satisfy ever increasing demands for wireless data traffic. For example, wireless communication systems are being developed toward increased spectral efficiency based on communication schemes such as Orthogonal Frequency Division Multiple Access (OFDMA), Multiple Input Multiple Output (MIMO), and the like in order to increase data rates.

As demands for traffic have accelerated due to increased demands for smartphones and tablet Personal Computers (PCs) and the resulting rapid growth of applications requiring a large amount of traffic, it is difficult to satisfy the soaring demands for wireless data simply by increasing spectral efficiency.

To avert the problem, recent interest has focused on a millimeter-wave wireless communication system. When wireless communication is provided in a millimeter-wave frequency band, propagation loss, such as path loss and reflection loss, is increased in view of the spectral nature of the millimeter-wave frequency band and the resulting shortened propagation distance reduces service coverage. Therefore, the millimeter-wave wireless communication system may expand service coverage by mitigating the path loss of waves using beamforming and thus increasing the propagation distance of the waves.

The two types of beamforming schemes are digital beamforming (or Transmit (Tx) pre-Inverse Fast Fourier Transform (pre-IFFT) beamforming/Receive (Rx) post-Fast Fourier Transform (post-FFT) beamforming) and analog beamforming (or Tx post-IFFT beamforming/Rx pre-FFT beamforming). Digital beamforming uses a plurality of Radio Frequency (RF) paths based on Multiple Input Multiple Output (MIMO) and a digital precoder or codebook in the digital domain, and analog beamforming uses a plurality of analog/RF devices (e.g., a phase shifter, a Power Amplifier (PA), and a Variable Gain Amplifier (VGA)) and an antenna configuration. While digital beamforming requires an expensive Digital to Analog Converter (DAC) or Analog to Digital Converter (ADC) and increases implementation complexity in order to increase a beamforming gain, analog beamforming has limitations in terms of efficient use of frequency resources or maximization of beamforming performance.

Since a wavelength is shortened in a millimeter-wave band, analog beamforming using an antenna array with a number of antenna elements arranged in a small space, such as a Uniform Linear Array (ULA) or a Uniform Planar Array (UPA), is suitable. However, the analog beamforming has limitations in its effectiveness in terms of efficient use of resources, the increase of user or system throughput through MIMO schemes such as Single User MIMO (SU-MIMO), Multiple User MIMO (MU-MIMO), or spatial multiplexing, and the increase of Signal to Noise Ratio (SNR) or reliability through diversity or additional digital beamforming, as described before.

Accordingly, there exists a need for supporting a hybrid beamforming which is a combination of analog beamforming and digital beamforming, for efficient MIMO/beamforming.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of transmitting and receiving a signal in a communication system.

Another aspect of the present invention is to provide a method and apparatus of transmitting and receiving a signal by beamforming in a millimeter-wave communication system.

Another aspect of the present invention is to provide a hybrid beamforming structure by combining analog beamforming and digital beamforming for use in signal transmission and reception between a Mobile Station (MS) and a Base Station (BS).

Another aspect of the present invention is to provide a method and apparatus of efficiently performing hybrid beamforming by selecting one or more best beams from one or more analog beam sets having directivity on uplink/downlink between an MS and a BS and operating a digital Multiple Input Multiple Output (MIMO)/beamforming efficiently using a beam pair based on the selected beams.

In accordance with an aspect of the present invention, a communication method using analog and digital hybrid beamforming is provided. The communication method includes receiving a first message including a measurement and selection condition for hybrid beamforming from a BS, measuring channels of a plurality of BS transmission beams according to the measurement and selection condition, selecting at least one BS transmission beam based on channel measurements according to the measurement and selection condition, transmitting report information about the selected at least one BS transmission beam to the BS, receiving from the BS a second message including a measurement and report condition for digital beamforming of a final BS transmission beam selected by the BS, estimating an effective channel matrix for the selected final BS transmission beam according to the measurement and report condition, determining feedback information for digital beamforming of the BS based on the effective channel matrix, transmitting the determined feedback information to the BS, and receiving a data burst from the BS according to a MIMO mode and/or a configuration scheduled based on the feedback information.

In accordance with another aspect of the present invention, a communication method using analog and digital hybrid beamforming is provided. The communication method includes transmitting to a MS a first message including a measurement and selection condition for hybrid beamforming of a plurality of BS transmission beams, receiving from the MS report information about at least one BS transmission beam selected according to the measurement and selection condition by the MS, selecting a final BS transmission beam for the MS based on the report information, transmitting to the MS a second message including a measurement and report condition for digital beamforming of the final BS transmission beam, receiving feedback information for digital beamforming of the BS from the MS, performing hybrid beamforming scheduling for the MS based on the feedback information, and transmitting a data burst to the MS according to a scheduled MIMO mode and/or configuration.

In accordance with another aspect of the present invention, an MS for performing communication using analog and digital hybrid beamforming is provided. The MS includes a digital beamformer, an analog beamformer, and a controller configured to control the digital beamformer and the analog beamformer. The controller is configured to receive a first message including a measurement and selection condition for hybrid beamforming from a BS, to measure channels of a plurality of BS transmission beams according to the measurement and selection condition, to select at least one BS transmission beam based on channel measurements according to the measurement and selection condition, to transmit report information about the selected at least one BS transmission beam to the BS, to receive from the BS a second message including a measurement and report condition for digital beamforming of a final BS transmission beam selected by the BS, to estimate an effective channel matrix for the selected final BS transmission beam according to the measurement and report condition, to determine feedback information for digital beamforming of the BS based on the effective channel matrix, to transmit the determined feedback information to the BS, and to receive a data burst from the BS according to a MIMO mode and/or a configuration scheduled based on the feedback information.

In accordance with another aspect of the present invention, a BS for performing communication using analog and digital hybrid beamforming is provided. The BS includes a digital beamformer, an analog beamformer, and a controller configured to control the digital beamformer and the analog beamformer. The controller is configured to transmit to an MS a first message including a measurement and selection condition for hybrid beamforming of a plurality of BS transmission beams, to receive from the MS report information about at least one BS transmission beam selected according to the measurement and selection condition by the MS, to select a final BS transmission beam for the MS based on the report information, to transmit to the MS a second message including a measurement and report condition for digital beamforming of the final BS transmission beam, to receive feedback information for digital beamforming of the BS from the MS, to perform hybrid beamforming scheduling for the MS based on the feedback information, and to transmit a data burst to the MS according to a scheduled MIMO mode and/or configuration.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
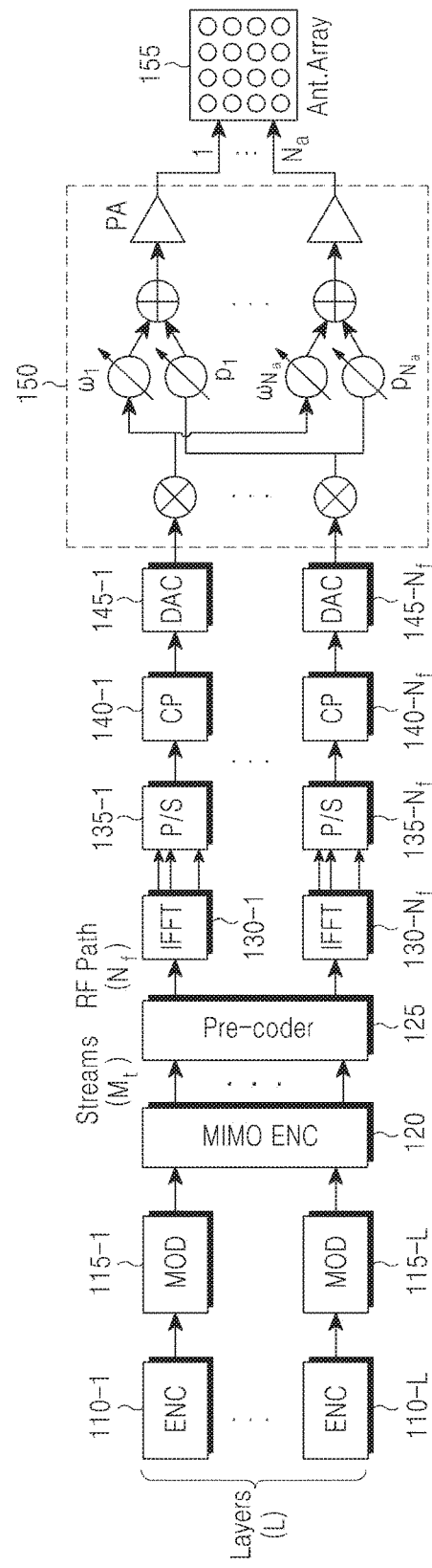
FIG. 1 is a block diagram of a physical layer of a Base Station (BS) transmitter to support beamforming according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to address the above-described technical aspects of the present invention. In an exemplary implementation, defined entities may have the same names, to which the present invention is not limited. Thus, exemplary embodiments of the present invention can be implemented with same or ready modifications in a system having a similar technical background.

Transmit (Tx) beamforming increases directivity by focusing signal waves in a specific direction through a plurality of antennas. A set of antennas is called an antenna array and the individual antennas of the antenna array are called antenna elements. The antenna array may take various forms including a linear array, a planar array, and the like. Tx beamforming may increase a propagation distance by increasing signal directivity. Since signals are seldom transmitted in directions other than a specific direction, Tx beamforming may also significantly reduce signal interference with users other than an intended user.

A receiver may also perform Receive (Rx) beamforming using an Rx antenna array. Since Rx beamforming increases the reception sensitivity of signals from a specific direction by focusing signal reception in the specific direction, excluding signals from the other directions, Rx beamforming may block signals causing interference.

A millimeter-wave wireless mobile communication system employs beamforming to mitigate high propagation path loss in a millimeter-wave frequency band. Furthermore, beamforming is needed in every case to reduce an unbalance between data and a control signal. The beamforming process as suggested by, for example, the Institute of Electrical and Electronics Engineers (IEEE) 802.11 ad standard includes two phases: Sector Level Sweep (SLS) and Beam Refinement Protocol (BRP).

IEEE 802.11 ad is a Wireless Local Area Network (WLAN) standard that provides a very small service area with a radius of 10 to 20 meters in the 60-GHz millimeter-wave band. To overcome a wave propagation problem encountered with the millimeter-wave band, beamforming is used.

During the SLS phase, a Station (STA) that will perform beamforming transmits the same sector frame repeatedly in different directions and a peer STA receives sector frames through quasi-omni antennas and transmits feedback regarding a direction having the highest sensitivity. Therefore, the STA may perform beamforming by acquiring information about the direction having the highest sensitivity from the peer STA.

During the BRP phase, Tx and Rx beam directions between the two STAs are fine-adjusted after the SLS phase in order to increase Tx and Rx beamforming gains. Typically, after the two STAs detect the best Tx beam during the SLS phase, they search for the best Rx beam matching the best Tx beam during the BRP phase. Additionally, the Tx-Rx beam pair may be further fine-adjusted by repeating the SLS and BRP phases.

Compared to the millimeter-wave wireless communication system, existing 2nd Generation (2G) to 4th Generation (4G) cellular communication systems are designed to transmit and receive control channels and data in a sub-1 GHz or 1 to 3 GHz frequency band in an isotropic or omni-directional fashion. However, some resources are optionally allocated to a user satisfying a specific channel condition by digital beamforming.

Research has been conducted to achieve an additional performance gain by utilizing the multipath propagation characteristics of channels with Tx/Rx diversity based on multiple transmission and reception antennas, such as Multiple Input Multiple Output (MIMO), in the existing cellular systems.

Meanwhile, the multipath propagation of channels is mitigated due to the afore-described channel characteristics and use of Tx/Rx beamforming in an extremely high frequency band like a millimeter-wave band. Therefore, a beamforming gain may be achieved but it is difficult to support Tx/Rx diversity. Accordingly, previous studies were limited to determination of a beamforming weight coefficient that optimizes a performance index such as Signal to Noise Ratio (SNR) by maximizing a beamforming gain during beamforming.

Wireless Gigabit (WiGig), which does not support MIMO, is implemented based on beamforming through an analog array of a plurality of Radio Frequency (RF)/antenna elements, basically in one RF path or RF chain. For beamforming, a transmitter sweeps beams of a specific beam pattern in a plurality of directions and a receiver selects a beam having the largest signal strength and transmits feedback about the selected beam to the transmitter. This technique is generally applicable to an indoor environment having a Line of Sight (LoS) channel path in a short range of a few meters without mobility. In an outdoor wireless mobile communication environment characterized by mobility of tens of kilometers per hour, fast terminal switching, obstacle-incurred Non-LoS (NLoS) path characteristics, or a rapidly changing channel state caused by channel fading, beamforming that forms narrow beams having directivity, maximizing a beam gain in a specific direction may only increase sensitivity due to performance degradation attributed to the user environment.

Another MIMO/BF technique is digital beamforming used in 3rd Generation Partnership Project (3GPP) Long Term Evolution (LTE) and Worldwide Interoperability for Microwave Access (WiMAX). Although the digital beamforming scheme supports MIMO/BF with fewer than eight streams based on digital precoding, it is difficult to apply the digital beamforming as a millimeter-wave band because of hardware complexity and large signal overhead in supporting multiple RF paths. In addition, a WiGig analog beamforming scheme has a limited performance due to use of a single beam without supporting beam sweeping and MIMO, and suffers from performance degradation in a multi-path channel environment.

Hybrid beamforming applicable to a cellular communication system according to an exemplary embodiment of the present invention combines analog beamforming that overcomes path loss by high-gain beamforming at an RF end with digital beamforming that maximizes capacity by MIMO.

A beamforming-based millimeter-wave wireless mobile communication system becomes sensitive to channel fading and obstacles due to large propagation loss, large penetration loss, and low multi-path propagation inherent to the channel propagation nature of a millimeter-wave band and strong directivity resulting from beamforming.

An analog and digital hybrid beamforming structure for transmission and reception between a Base Station (BS) and a User Equipment (UE) selects one or more best beams from one or more analog beam sets having directivity on downlink and uplink and performs digital MIMO/BF efficiently using the selected beams in combination. Therefore, a large propagation loss in the millimeter-wave band is mitigated, and performance such as channel capacity or diversity is maximized by additional use of a MIMO/BF scheme.

For this purpose, a hybrid beamforming mode is selected in an exemplary embodiment of the present invention. A BS transmits reference signals in multi-directional beams that cover beam spaces and indicates a beam-space analog beam selection mode to an MS. The mode selection may be based on the state of the MS in a connected mode. The MS selects one or more analog beams (i.e., BS Tx beams) by beam space sweeping and measurement and reports information about the selected one or more analog beams to the BS.

In an exemplary implementation, the BS indicates a selected Tx analog beam to the MS and the MS estimates a beam spatial channel matrix (or an effective channel matrix) made up of beamforming coefficients for the selected analog beam. Subsequently, the BS and/or the MS selects a MIMO mode and a precoder based on the beam spatial channel matrix. The MS may select the precoder using a given codebook or the BS may determine a precoding matrix based on the beam spatial channel matrix reported by the MS.

FIG. 1 is a block diagram of a physical layer of a BS transmitter that supports beamforming according to an exemplary embodiment of the present invention. The physical layer is configured as a hybrid structure that uses analog beamforming and digital beamforming simultaneously, by way of example.

Referring to FIG. 1, L digital signals corresponding to L layers are provided to a MIMO encoder 120 through encoders (ENCs) 110-1 to 110-L and modulators (MODs) 115-1 to 115-L. A precoder 125 converts $M_t$ streams received from the MIMO encoder 120 to $N_f$ precoded signals corresponding to $N_f$ RF paths. The precoded signals are provided to an analog beamformer 150 in RF paths including Inverse Fast Fourier Transforms (IFFTs) 130-1 to 130-$N_f$, Parallel-to-Serial (P/S) converters 135-1 to 135-$N_f$, Cyclic Prefix (CP) inserters 140-1 to 140-$N_f$, and Digital to Analog Converters (DACs) 145-1 to 145-$N_f$.

The analog beamformer 150 at the rear ends of the DACs 145-1 to 145-$N_f$ includes a plurality of frequency converters or mixers, a plurality of phase shifters, and a plurality of Power Amplifiers (PAs) or Variable Gain Amplifiers (VGAs) corresponding to the respective RF paths and forms beams to be transmitted in a specific direction by controlling the phases and amplitudes of signals input to a plurality of antenna elements in the RF paths. The beams are transmitted through an antenna array 155 that is formed by grouping a plurality of antenna elements to increase a beamforming gain.

Digital beamforming through RF paths including the IFFTs 130-1 to 130-$N_f$, the MIMO encoder 120, and the precoder 125 before the DACs 145-1 to 145-$N_f$ enables achievement of an additional beamforming gain, Multi Unit-MIMO (MU-MIMO), frequency selective allocation, and multi-beam forming. Of course, it is to be understood that the hybrid beamforming structure illustrated in FIG. 1 may be modified in various manners by modifying and/or combining a plurality of blocks.

One or more beams having different beam widths and beam gains that are generated from the hybrid beamforming structure may be used in different manners according to the channel characteristics of a reference signal, a data channel, and/or a control channel, the mobility and channel characteristics of an MS, uplink/downlink, or transmission/reception. A selected beam is formed by controlling the beamforming coefficient of an analog or digital end so that the beam has a specific beamwidth and beam gain in a specific direction. If the same input power is set for the antenna elements, a maximum beam gain in the steered direction of the beam becomes smaller by setting a wider beamwidth.

Figure 2:
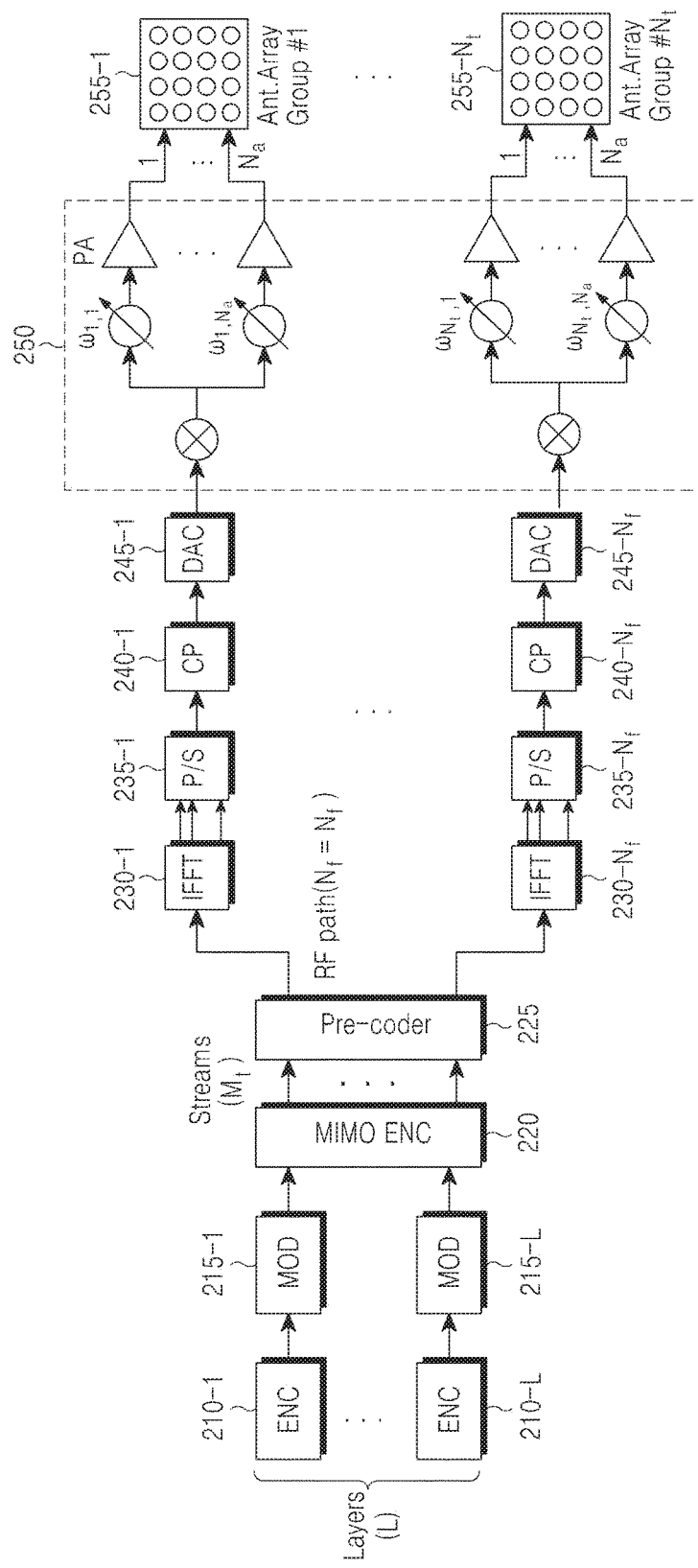
FIG. 2 is a block diagram of a physical layer of a BS transmitter to support beamforming according to an exemplary embodiment of the present invention.

FIG. 2 is a block diagram of a physical layer of a BS transmitter to support beamforming according to an exemplary embodiment of the present invention.

Referring to FIG. 2, L digital signals corresponding to L layers are provided to a MIMO encoder 220 through encoders (ENCs) 210-1 to 210-L and modulators (MODs) 215-1 to 215-L. A precoder 225 converts $M_t$ streams received from the MIMO encoder 220 to $N_f$ precoded signals corresponding to $N_f$ RF paths. The precoded signals are provided to an analog beamformer 250 in RF paths including IFFTs 230-1 to 230-$N_f$, P/S converters 235-1 to 235-$N_f$, CP inserters 240-1 to 240-$N_f$, and DACs 245-1 to 245-$N_f$.

The analog beamformer 250 forms beams to be transmitted in a specific direction through a plurality of phase shifters and a plurality of PAs or VGAs. The beams are transmitted through $N_t$ antenna array groups 255-1 to 255-$N_t$. In the hybrid beamforming structure illustrated in FIG. 2, the $N_f$ RF paths correspond to the $N_t$ antenna array groups.

Figure 3A:
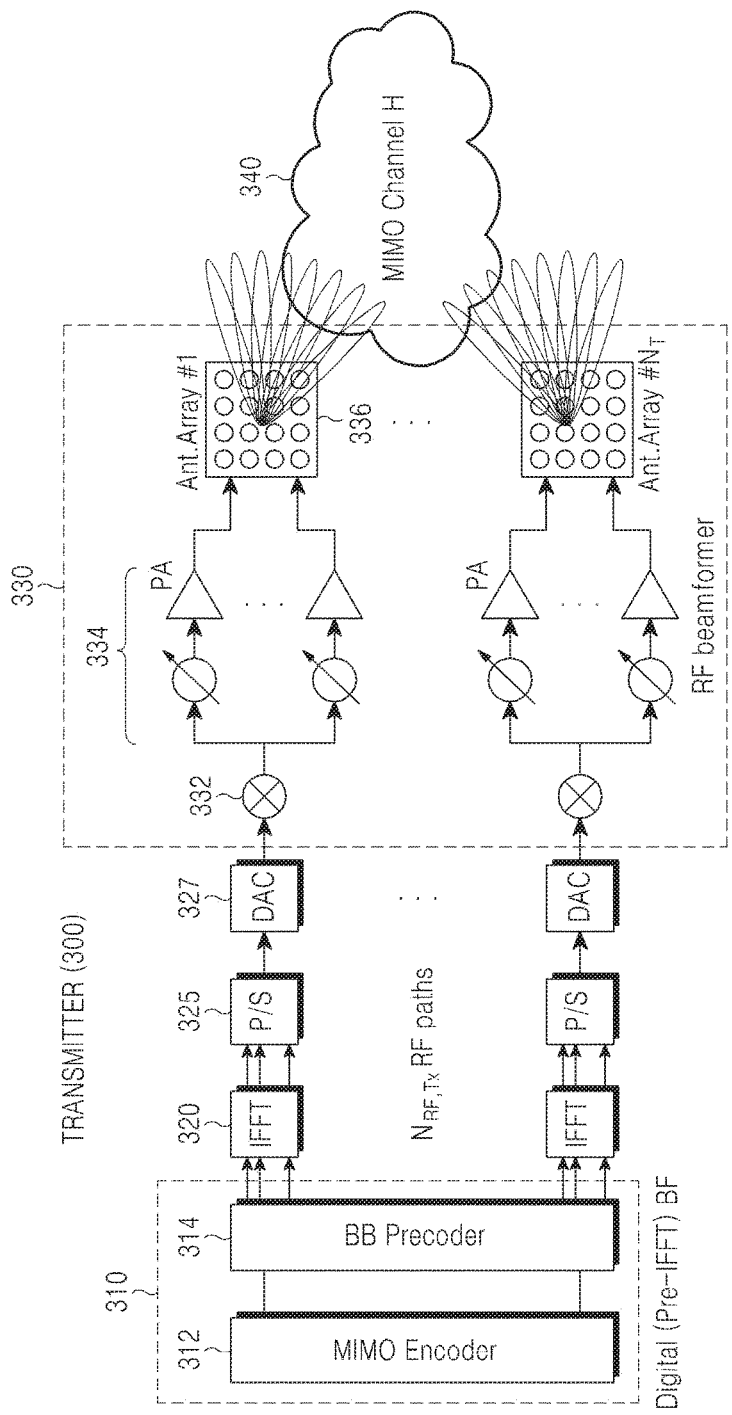
FIGS. 3A and 3B are block diagrams of hybrid Transmission (Tx) and Reception (Rx) beamforming structures according to an exemplary embodiment of the present invention.
Figure 3B:
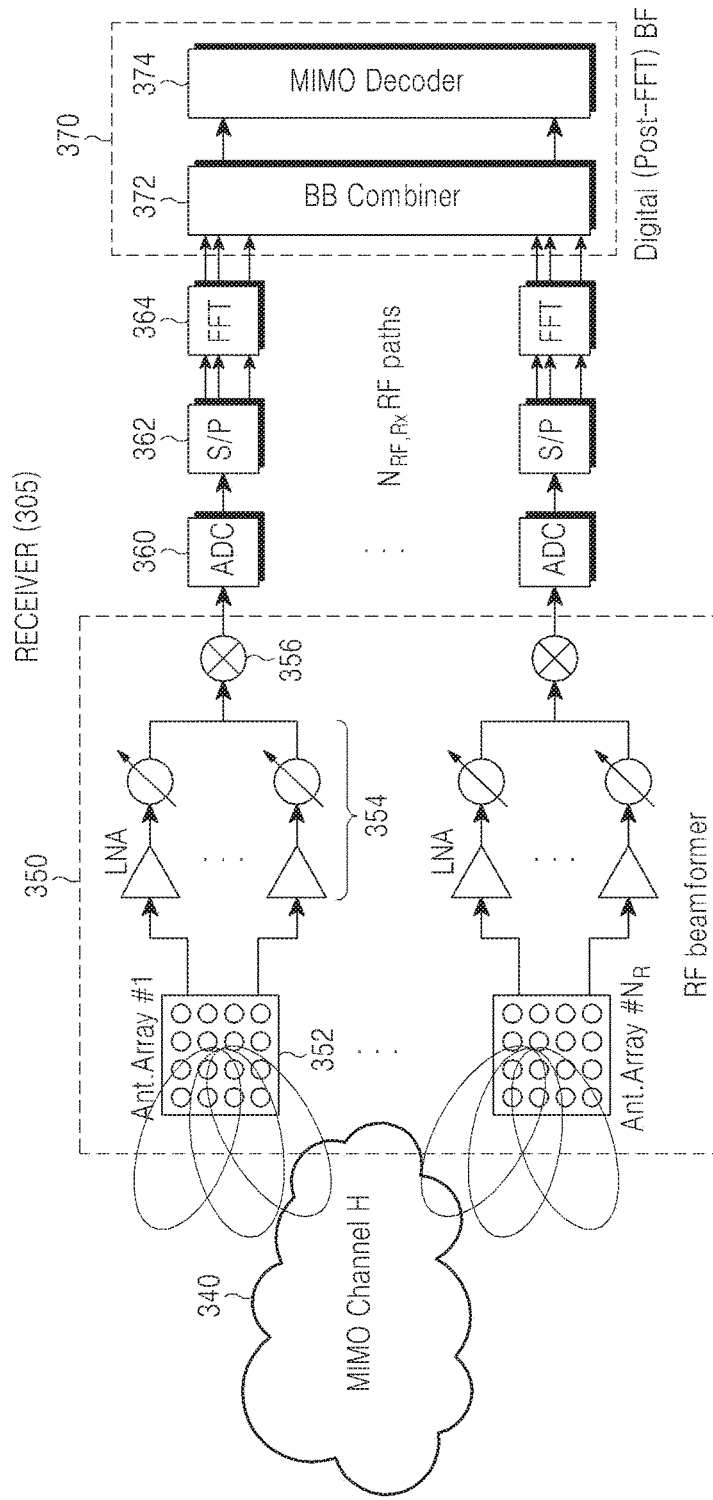

FIGS. 3A and 3B are block diagrams of hybrid Tx and Rx beamforming structures according to an exemplary embodiment of the present invention.

Referring to FIGS. 3A and 3B, a transmitter 300 includes a digital beamformer 310 and an analog beamformer 330. The digital beamformer 310 is connected to the analog beamformer 330 through a plurality of RF paths including IFFTs 320, P/S converters 325, and DACs 327.

The digital beamformer 310 includes a MIMO encoder 312 and a BaseBand (BB) precoder 314. The analog beamformer 330 includes frequency converters 332, phase shifters/PAs 334, and antenna arrays 336 in the respective RF paths. Analog beams are formed in the antenna arrays 336 mapped to the respective RF paths (i.e., RF chains). While not shown, the transmitter 300 may further include a controller to control the digital beamformer 310 and the analog beamformer 330, to acquire information needed for hybrid beamforming, to exchange the information with a receiver, and to determine information needed to control the digital beamformer 310 and the analog beamformer 330, for example, a beamforming coefficient matrix.

Beams formed by the transmitter 300 are transmitted to a receiver 305 on beam-spatial effective channels established over MIMO channels (H) 340 between multiple channels of the transmitter and the receiver. Similarly to the transmitter 300, the receiver 305 includes an analog beamformer 350 and a digital beamformer 370. The analog beamformer 350 is connected to the digital beamformer 370 through a plurality of RF paths including Analog to Digital Converters (ADCs) 360, Serial to Parallel (S/P) converters 362, and Fast Fourier Transforms (FFTs) 364. The analog beamformer 350 includes antenna arrays 352, Low Noise Amplifiers (LNAs)/phase shifters 354, and frequency converters 356 in the respective RF paths. The digital beamformer 370 includes a BB combiner 372 and a MIMO decoder 374.

While not shown, the receiver 305 may further include a controller to control the digital beamformer 370 and the analog beamformer 350, to acquire information needed for hybrid beamforming, to exchange the information with the transmitter 300, and to determine information required to control the digital beamformer 370 and the analog beamformer 350, for example, a beamforming coefficient matrix. The controller determines the best analog beam by performing channel estimation on analog beams received from the antenna arrays 352 mapped to the respective RF paths (i.e., RF chains).

The transmitter 300 forms analog beams having directivity in different directions by analog beamforming and transmits and receives data with improved performance in an analog Tx-Rx beam pair selected from among analog Tx and Rx beams by additional digital MIMO/BF processing.

Figure 4:
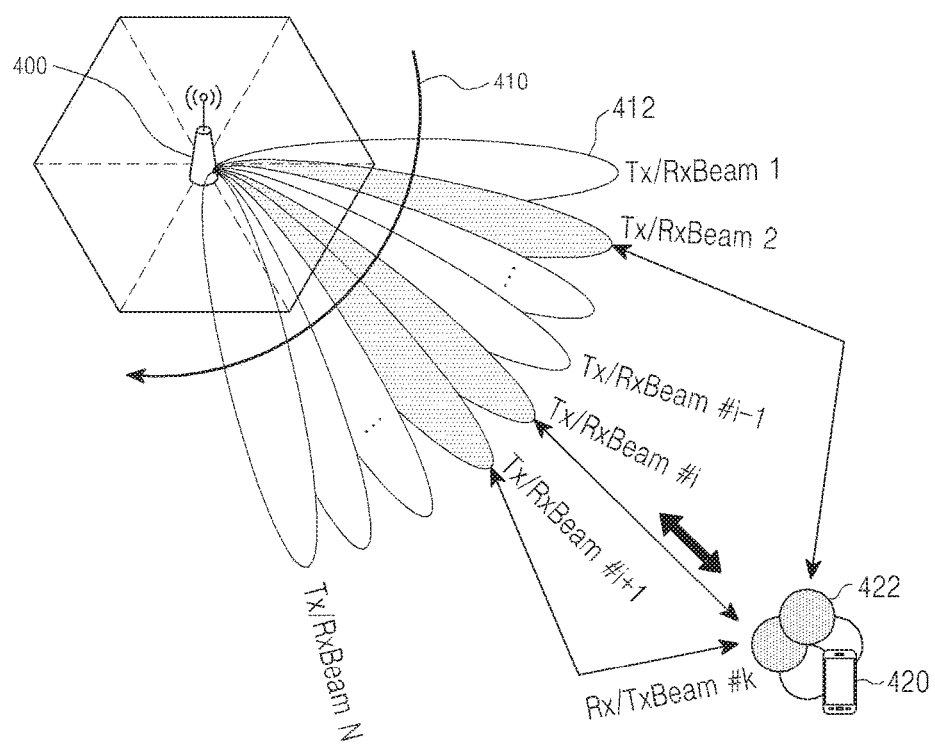
FIG. 4 illustrates communication between a BS and a Mobile Station (MS) according to an exemplary embodiment of the present invention.

FIG. 4 illustrates communication between a BS and an MS according to an exemplary embodiment of the present invention.

Referring to FIG. 4, a BS 400 manages a cell divided into one or more sectors as its service coverage area and forms a plurality of Tx/Rx beams 412 using the afore-described digital and analog hybrid beamforming structure. The BS 400 transmits a plurality of beamformed signals by sweeping them simultaneously or successively, as indicated by reference numeral 410.

An MS 420 located within the cell of the BS 400 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the MS 420 does not support Rx beamforming, the MS 420 measures the channel quality of a reference signal in each transmission beam and reports the measurements to the BS 400. The BS 400 selects the best beam for the MS 420 from among a plurality of Tx beams. If the MS 420 is configured to support Rx beamforming, the MS 420 measures the channel qualities of a plurality of Tx beams 422 received from the BS 400 for each reception beam pattern and reports total or some high-ranked measurements of all Tx-Rx beam pairs to the BS 400. The BS 400 may allocate an appropriate Tx beam to the MS 420. If the MS 420 is capable of receiving a plurality of Tx beams from the BS 400 or supporting a plurality of BS Tx-MS Rx beam pairs, the BS 400 may select a beam, taking into account diversity transmission through repeated transmission or simultaneous transmission.

Figure 5:
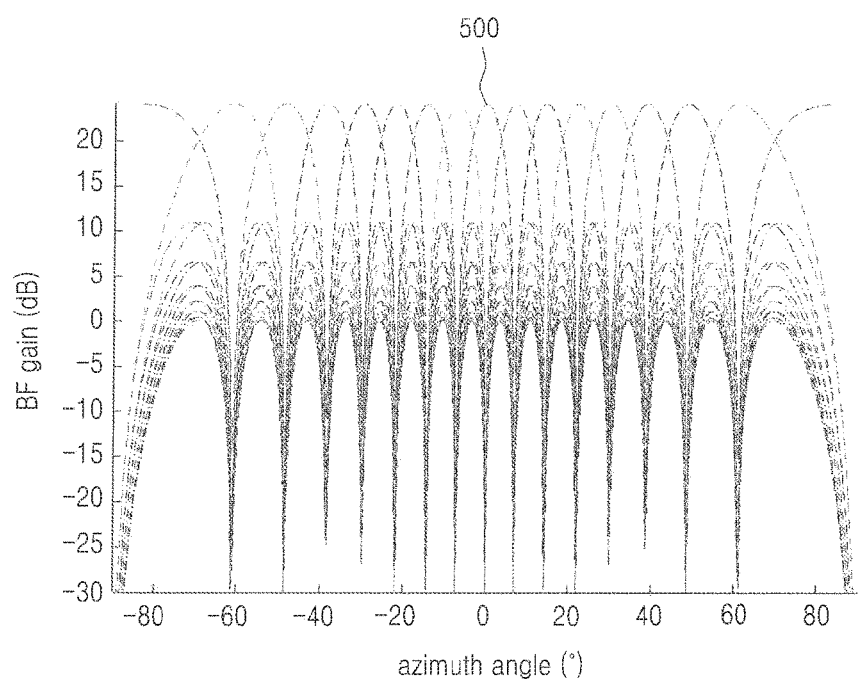
FIG. 5 illustrates exemplary analog beams formed in different directions in order to cover a specific cell/sector area in a beam space according to an exemplary embodiment of the present invention.

FIG. 5 illustrates exemplary analog beams formed in different directions in order to cover a specific cell/sector area in a beam space according to an exemplary embodiment of the present invention. In the illustrated case of FIG. 5, beams patterns are formed by use of a single antenna array.

Referring to FIG. 5, a plurality of beams having predetermined beamwidths and predetermined beam gains may be formed with respect to a beam 500 in a reference direction (at an azimuth angle or elevation angle of 0).

Figure 6:
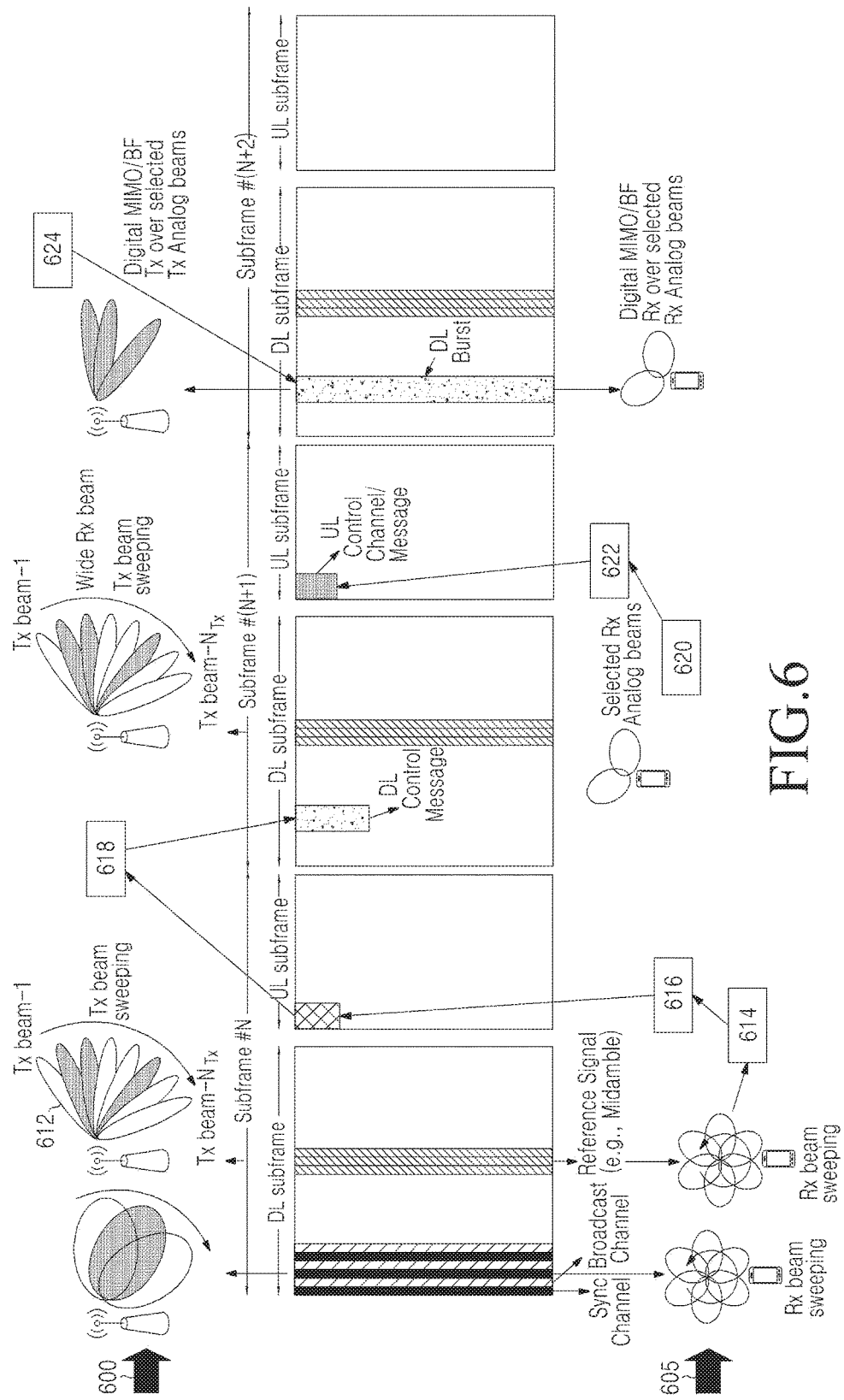
FIG. 6 illustrates an analog and digital hybrid beamforming procedure according to an exemplary embodiment of the present invention.

FIG. 6 illustrates an analog and digital hybrid beamforming procedure according to an exemplary embodiment of the present invention. While a Time Division Duplex (TDD) frame divided into a synchronization/broadcasting channel region, Downlink (DL) subframes, and Uplink (UL) subframes is shown as an example in FIG. 6, it is to be understood that the hybrid beamforming procedure is applicable to a Frequency Division Duplex (FDD) frame or other frame structures in the same manner or in a similar manner.

Referring to FIG. 6, a BS 600 forms one or more analog beams per RF chain or antenna array in different directions within a cell/sector and transmits a reference signal such as a mid-amble or Channel State Information Reference Signal (CSI-RS) in each analog beam so that an MS may measure the channel quality of an analog beam steered in each direction (e.g., a Carrier-to-Interference-and-Noise Ratio (CINRs), Received Signal Strength Indicator (RSSIs), etc.) in step 612. The reference signals may be transmitted in $N_{Tx}$ sub-time areas of a predetermined time area in a DL subframe.

$N_{Tx}$ is the number of analog beams transmitted through each RF chain or antenna array from the BS. More specifically, the BS allocates the reference signals of different RF chains to be transmitted in one analog Tx beam to different frequency resources in one sub-time area (e.g., a symbol duration). Therefore, for each RF chain, reference signals are transmitted in analog Tx beams formed in different directions across $N_{Tx}$ sub-time areas.

In step 614, an MS 605 measures the channels of the respective analog beams from the reference signals, for each BS RF chain and selects one or more BS RF chains or antenna arrays or one or more analog beams per BS RF chain or antenna array, which satisfy a specific threshold or condition suitable for data transmission and reception between the BS and the MS based on channel qualities (e.g., CINRs, RSSIs, etc.) obtained from the measurements. For example, the MS 605 may select M BS analog beams at maximum or M analog beams per BS RF chain or antenna array at maximum according to a given value of M.

If the MS 605 also supports hybrid beamforming, the MS 605 may measure the channel qualities of BS Tx-MS Rx analog beam pairs, while sweeping one or more MS Rx beams and may select one or more BS Tx analog beams or one or more BS Tx-MS Rx analog beam pairs based on the measurements. A criterion or condition based on which a Tx/Rx analog beam is selected may be determined based on a threshold set by the MS 605 or a specific beam selection metric and/or threshold indicated to all MSs or each individual MS within the cell by the BS 600.

The beam selection metric may be expressed as various forms. For example, the beam selection metric may include effective channels for one or more analog beams being carried through one or more RF chains and average, highest, or lowest SNR of respective MIMO streams calculated by measuring a channel matrix having the effective channels as entries. In another example, the beam selection matrix may be a channel capacity calculated by a channel capacity formula.

In step 616, the MS 605 reports to the BS information indicating one or more BS RF chains or antenna arrays that have been selected based on the measurements of the channel qualities of all possible BS Tx-MS Rx analog beam pairs, and analog beam index information indicating one or more analog Tx beams or one or more BS Tx-MS Rx analog beam pairs per RF chain or antenna array. The reported information may be transmitted, for example, in a predetermined reporting area of a UL subframe. In step 618, the BS 600 may downselect a final BS Tx analog beam(s) based on the analog beam index information, taking into account scheduling. The BS 600 transmits information about selected final BS RF chains or antenna arrays and information about a selected final analog Tx beam(s) per RF chain or antenna array to the MS 605 by a DL control message in a DL subframe.

In step 620, the MS 605 estimates an effective channel matrix of a beam space regarding the selected final BS Tx analog beams and best MS Rx analog beams mapped to the BS Tx analog beams. The effective channel matrix may be obtained by applying BS Tx analog beamforming and MS Rx analog beamforming to a channel matrix between the Tx antennas of the BS 600 and the Rx antennas of the MS 605 in an antenna space. For example, the effective channel matrix may be expressed as Equation (1).

$$y = W^*_{BB,MS} W^*_{RF,MS} H W_{RF,BS} W_{BB,BS} s + n = W^*_{BB,MS} \overline{H} W_{BB,BS} s + n$$

$$\overline{H} = W^*_{RF,MS} H W_{RF,BS} : N_{RF,MS} \times N_{RF,BS} \quad \text{Equation (1)}$$

In Equation (1), H represents an ideal channel matrix, $\overline{H}$ represents an estimated effective channel matrix, s represents a transmitted signal, y represents a received signal, and n represents noise. $W_{BB}$ represents a beamforming coefficient matrix used in the digital beamformer and $W_{RF}$ represents a beamforming coefficient matrix used in the analog beamformer. Subscripts MS and BS represent beamforming coefficient matrixes used respectively in the MS and the BS. $N_{RF,MS}$ and $N_{RF,BS}$ represent the numbers of RF paths in the MS and the BS, respectively.

The MS 605 estimates or predicts at least one of an optimum MIMO rank (or an optimum number of MIMO streams), an optimum MIMO precoder (or codebook), an effective CINR (or Channel Quality Indication (CQI)), and an optimum Modulation and Coding Scheme (MCS) level for digital beamforming of the BS 600, using the estimated effective channel matrix, in step 620.

In an alternative exemplary embodiment, the MS 605 may determine a supported MIMO rank or the number of supported MIMO streams based on an effective channel matrix made up of one or more BS RF chains or antenna arrays, analog beams for each of the BS RF chains or antenna arrays, one or more MS RF chains or antenna arrays, and analog beams for each of the MS RF chains or antenna arrays. In addition, the MS 605 may select a precoder or codebook that maximizes the afore-described beam selection metric based on the average, highest, or lowest of the SNRs of MIMO streams or a channel capacity, which is estimated over each of specific Tx precoders, predetermined codebooks, or Precoder Matrix Indexes (PMIs) for precoding in a transmitter. An effective CINR is estimated based on the selected precoder or codebook.

The supported MIMO rank or the number of supported MIMO streams is limited by the maximum number of RF chains that the BS allocates to the MS, arbitrarily by the BS, or additionally by the number of RF chains or antenna arrays selected by the BS or the MS. In another exemplary embodiment, the BS or the MS presets the supported MIMO rank or the number of supported MIMO streams. The MS may select a codebook or PMI that optimizes transmission performance within the MIMO rank or the number of MIMO streams, estimate an effective CINR corresponding to the selected codebook or PMI, and feed back the estimated effective CINR to the BS.

The MS 605 feeds back the estimated or predicted information to the BS 600 in step 622. The BS 600 performs hybrid beamforming scheduling for the MS 605 based on the feedback information and transmits a DL data burst to the MS 605 according to a scheduled MIMO mode and/or MCS level in step 624.

In another exemplary embodiment of the present invention, the MS 605 may feed back information about the estimated effective channel matrix to the BS 600 in step 622. The BS 600 may select an appropriate MIMO precoder (or codebook) directly by performing Singular Value Decomposition (SVD) of the effective channel matrix or a different MIMO/BF scheme based on the feedback information and may perform scheduling and data transmission in step 624. Herein, this technique of feeding back an effective channel matrix will be referred to as an analog feedback of an effective channel matrix.

In another exemplary embodiment of the present invention, the MS 605 may perform steps 614 through 620 simultaneously, instead of sequentially performing the operation of selecting BS RF chains or antenna arrays and an analog beam per RF chain or antenna array or selecting a combination of BS RF chains or antenna arrays, a Tx analog beam per BS RF chain or antenna array, MS RF chains or antenna arrays, and an Rx analog beam per MS RF chain or antenna array, the operation of selecting a MIMO rank or the number of MIMO streams, and a precoder, codebook, or PMI, taking into account digital MIMO precoding of the selected RF chains or antenna arrays and the selected Tx and/or Rx analog beams, and the operation of estimating an effective CINR or CQI in steps 614 through 620. More specifically, the MS 605 may perform computation over every possible combination of a BS Tx RF chain or antenna array, Tx analog beams of the BS Tx RF chain or antenna array, an MS Rx RF chain or antenna array, and Rx analog beams of the MS Rx RF chain or antenna array, for use in selecting the number of MIMO streams or a MIMO codebook. Substantially simultaneously, the MS 605 may select information such as RF chains or antenna arrays of the BS and the MS, analog beams for each of the RF chains or antenna arrays, the number of MIMO streams, and a digital precoder or codebook. The selected information is reported as an analog feedback to the BS 600.

While the operations and procedures of an MS and a BS have been described above in the context of DL hybrid beamforming, the MS and the BS may operate in a similar manner for UL hybrid beamforming by exchanging their roles in the DL hybrid beamforming.

Figure 7A:
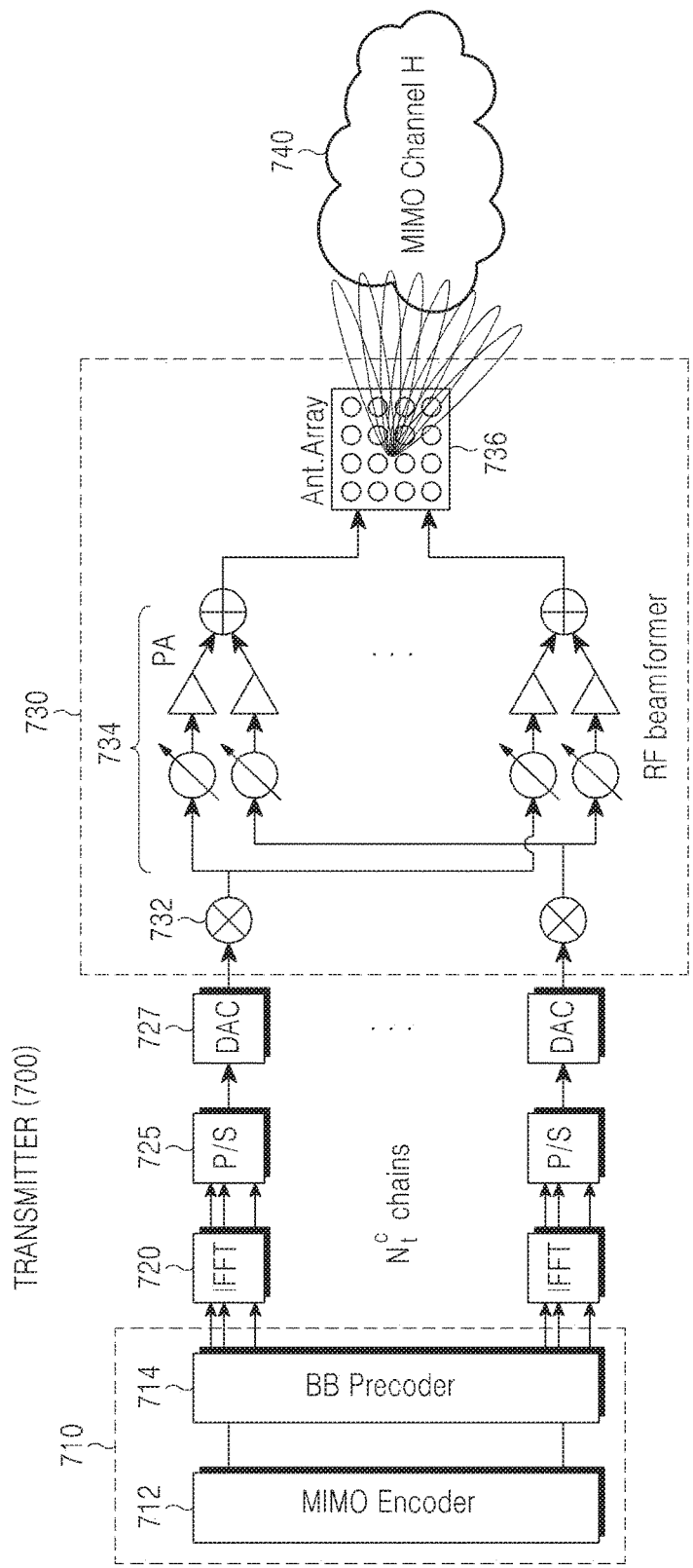
FIGS. 7A and 7B are block diagrams of hybrid Tx and Rx beamforming structures according to an exemplary embodiment of the present invention.
Figure 7B:
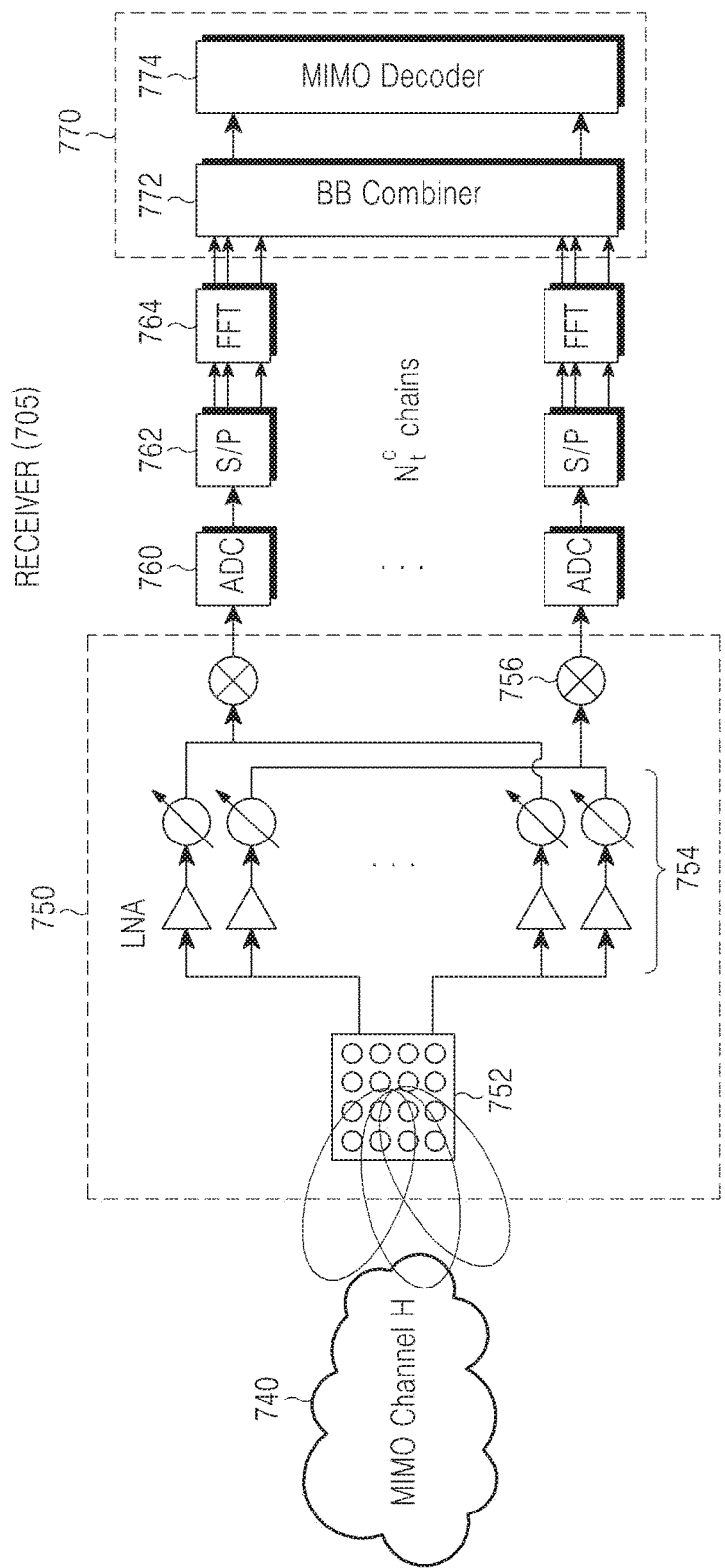

FIGS. 7A and 7B are block diagrams of hybrid Tx and Rx beamforming structures according to another exemplary embodiment of the present invention. In the hybrid Tx and Rx beamforming structures which are configured based on the hybrid beamforming structure illustrated in FIG. 1, Tx and Rx analog beams having directivity are formed in different directions by analog beamforming between an MS and a BS and a Tx-Rx analog beam pair selected from among the Tx and Rx analog beams is subjected to additional digital MIMO/BF processing. Therefore, data transmission and reception are performed with improved performance.

Referring to FIG. 7A, a transmitter 700 includes a digital beamformer 710 and an analog beamformer 730. The digital beamformer 710 is connected to the analog beamformer 730 through a plurality of RF paths including IFFTs 720, P/S converters 725, and DACs 727. The digital beamformer 710 includes a MIMO encoder 712 and a BB precoder 714. The analog beamformer 730 includes frequency converters 732 and phase shifters/PAs 374 for the respective RF paths. Signals from the phase shifters/PAs 734 are summed on an antenna element basis and provided to the antenna elements of an antenna array 736. Analog beams are formed by the single antenna array 736 shared by the plurality of RF paths (i.e., RF chains).

While not shown, the transmitter 700 may further include a controller to control the digital beamformer 710 and the analog beamformer 730, to acquire information needed for hybrid beamforming, to exchange the information with a receiver, and to determine information needed to control the digital beamformer 710 and the analog beamformer 730, for example, a beamforming coefficient matrix.

Beams formed by the transmitter 700 are transmitted to a receiver 705 on beam-space effective channels established over MIMO channels H 740 between multiple channels of the transmitter 700 and the receiver 705.

Referring to FIG. 7B, similarly to the transmitter 700, the receiver 705 includes an analog beamformer 750 and a digital beamformer 770. The analog beamformer 750 is connected to the digital beamformer 770 through a plurality of RF paths including ADCs 760, S/P converters 762, and FFTs 764. The analog beamformer 750 includes an antenna array 752 having antenna elements corresponding to the RF paths, and LNAs/phase shifters 754 and frequency converters 756 corresponding to the respective RF paths. The digital beamformer 770 includes a BB combiner 772 and a MIMO decoder 774.

While not shown, the receiver 705 may further include a controller to control the digital beamformer 770 and the analog beamformer 750, acquire information needed for hybrid beamforming, exchange the information with the transmitter 700, and determine information required to control the digital beamformer 770 and the analog beamformer 750, for example, a beamforming coefficient matrix. The controller performs channel estimation on analog beams output from the plurality of RF paths (i.e., RF chains) sharing the single antenna array and thus determines the best analog beam based on the channel estimation.

The transmitter 700 forms analog beams having directivity in different directions by analog beamforming and transmits and receives data with improved performance in a Tx-Rx analog beam pair selected from among Tx and Rx analog beams by additional digital MIMO/BF processing.

In another exemplary embodiment of the present invention, the transmitter of FIG. 3A and the receiver of FIG. 7B may be used or the transmitter of FIG. 7A and the receiver of FIG. 3B may be used. In another exemplary embodiment of the present invention, a transmitter and a receiver may be configured by modifying the hybrid beamforming structure of FIG. 1 or FIG. 2.

Now a description will be given of an exemplary operation of an MS to select an analog beam (i.e., a BS Tx beam) and estimate and select a digital precoder or codebook for additional digital MIMO/BF processing and an exemplary operation of a BS corresponding to the operation of the MS, when hybrid beamforming is implemented. While the following description is given of a DL operation in which the BS transmits a signal and the MS receives a signal, substantially the same thing is applicable to a UL operation.

The BS and the MS simultaneously or sequentially perform an operation of selecting one or more analog beams (i.e., BS Tx beams) or one or more BS Tx-MS Rx beam pairs for hybrid beamforming and an operation of scheduling digital MIMO/BF for the selected one or more analog beams or BS Tx-MS Rx beam pairs.

Figure 8:
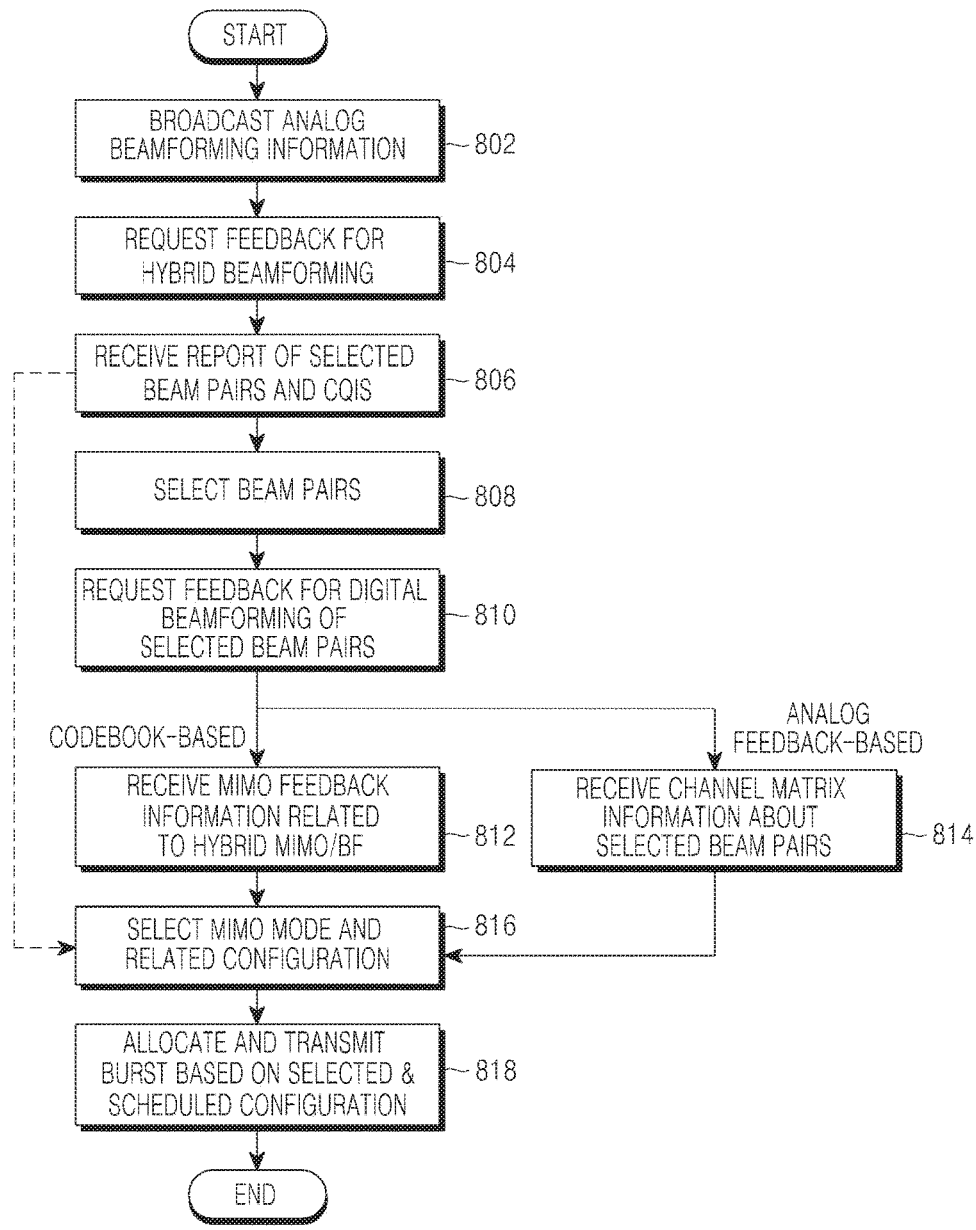
FIG. 8 is a flowchart illustrating a scheduling procedure for hybrid Multiple Input Multiple Output/BeamForming (MIMO/BF) according to an exemplary embodiment of the present invention.

FIG. 8 is a flowchart illustrating a scheduling procedure for hybrid MIMO/BF according to an exemplary embodiment of the present invention.

Referring to FIG. 8, the BS broadcasts or unicasts information about beamforming supported by the BS to the MS in step 802. The beamforming information includes analog beamforming information. The analog beamforming information specifies, for example, at least one of the number of BS RF chains or antenna arrays, the number of BS Tx beams per BS RF chain or antenna array formed in different directions, the array gain of each BS Tx beam, the number of beams supported simultaneously by the BS, the number of beams supported simultaneously for one MS or one burst, and the configuration of reference signals per BS Tx beam. The beamforming information may further include digital beamforming information for hybrid beamforming. In an exemplary embodiment of the present invention, if digital beamforming is used according to a digital precoder scheme based on a quantized codebook, the digital beamforming information includes information about a codebook set available to the MS. In another exemplary embodiment of the present invention, the analog beamforming information may be broadcast or unicast to each MS within the cell and the digital beamforming information may be unicast to an MS that has selected an analog beam pair.

In step 804, the BS transmits a request message requesting feedback information for hybrid beamforming, particularly analog beamforming, to an MS that has performed or is performing network entry. The request message may include a measurement/selection condition based on which an RF chain or antenna array, an analog beam, a digital MIMO precoding scheme, and the like are selected for hybrid beamforming.

For example, the measurement/selection condition includes at least one of the number of BS Tx RF chains or antenna arrays, the (maximum) number of BS Tx beams to be reported per BS Tx RF chain or antenna array, the (maximum) number of beam pairs to be reported, the (maximum) number of BS Tx beams to be reported per MS Rx beam, and the (maximum) number of MS Rx beams to be reported. In another example, the measurement/selection condition includes at least one of the (maximum) number of MIMO streams, a channel quality condition used to select a BS Tx beam or a BS Tx-MS Rx beam pair, and a specific MIMO mode about which feedback information is to be transmitted.

The channel quality condition may include, for beam selection, for example, at least one of a signal strength threshold (e.g., CINR, RSSI, etc. threshold) $\text{CINR}_{Th}/\text{RSSI}_{Th}$, a relative threshold $\Delta\text{CINR}_{th}/\Delta\text{RSSI}_{Th}$, a standard deviation threshold $\sigma_{Th}/\sigma_{RSSI}$, a correlation threshold $\rho_{Th}$, a combined CINR/RSSI threshold for selected multiple beam pairs, and a threshold for the difference between a predetermined reference (e.g., the maximum CINR/RSSI of the selected multiple beam pairs) and the CINRs/RSSIs of the selected multiple beam pairs. The specific MIMO mode may be at least one of Multiple Input Multiple Output-Spatial Multiplexing (MIMO-SM), Multiple Input Multiple Output-Space Time Code (MIMO-STC), and MIMO/BF. The measurement/selection condition may further include a supported MIMO rank or the number of supported MIMO streams, set by the BS.

In step 806, the MS feeds back to the BS a report message including information about one or more BS RF chains or antenna arrays and one or more beam pairs (or BS Tx beams) that are selected based on the measurement/selection condition, and Channel State Information (CSI) (e.g., RSSIs, CINRs, etc.) of the beam pairs (or BS Tx beams). The BS downselects one or more BS RF chains or antenna arrays and one or more beam pairs per BS RF chain or antenna array, taking into account its scheduling criterion based on the information about the selected beam pairs (or BS Tx beams) and the CSI about the beam pairs (or BS Tx beams) in step 808.

In step 810, the BS transmits a request message requesting feedback information about the selected one or more beam pairs to the MS, for digital beamforming. The request message includes information about the one or more BS RF chains or antenna arrays selected by the BS and one or more beam pairs selected for each of the BS RF chains or antenna arrays. The request message may further include digital beamforming information. The digital beamforming information includes information about a channel measurement and feedback report condition for the selected beam pairs. For example, the channel measurement and feedback report condition specifies, for example, the maximum number of BS RF paths allocated to the MS, the maximum number of MIMO streams, and feedback information needed for analog/digital/hybrid MIMO/BF.

In an exemplary embodiment of the present invention, if digital beamforming is used according to a digital precoder scheme based on a quantized codebook, the digital beamforming information includes information about a codebook set available to the MS. In another exemplary embodiment of the present invention, the BS and the MS may commonly pre-store information about a codebook preset or predefined according to a predetermined rule.

In an alternative exemplary embodiment of the present invention, the digital beamforming information may include information indicating whether digital beamforming is to be performed based on an analog feedback or a codebook. In another alternative exemplary embodiment of the present invention, the digital beamforming information may indicate a feedback to be received. For example, the digital beamforming information may specify at least one of an optimum MIMO mode estimated by the MS, a preferred PMI representing an optimum digital precoder, an optimum codebook, the number of MIMO streams, estimated CSI, an estimated MCS level, the elements of a channel matrix, and the channel matrix or its equivalent.

Step 812 or step 814 is performed depending on whether beamforming is performed based on a codebook or an analog feedback. The type of digital beamforming to be used may be determined in various manners including negotiations between the BS and the MS, an indication from the BS, a request from the MS, the capabilities of the BS and the MS, a system standard, and the like.

In step 812, the BS receives feedback information for codebook-based digital beamforming from the MS. The feedback information includes at least one of an optimum MIMO mode, a preferred PMI representing an optimum digital precoder, an optimum codebook, the number of MIMO streams, CSI, and an MCS level, which are estimated based on the selected beam pairs by the MS. In step 814, the BS receives feedback information for analog feedback-based digital beamforming from the MS. The feedback information is information needed to reconfigure the elements of a channel matrix, the channel matrix, or an equivalent of the channel matrix. For example, the feedback information may include a normalized channel matrix, a decomposed channel matrix, or a channel covariance matrix.

In step 816, the BS finally performs scheduling for hybrid beamforming by combining the feedback information for digital beamforming received in step 812 or 814 with the feedback information for analog beamforming received in step 806. Thus, the BS determines a MIMO mode and its related configuration, for example, selected beam pairs, MIMO streams, a PMI representing a selected digital precoder, and an MCS level. The BS allocates a data burst according to the selected/scheduled configuration and transmits the allocated data burst to the MS in step 818.

For example, if the BS receives feedback information about a channel matrix for analog feedback-based digital beamforming from the MS, the BS estimates the channel capacities of different MIMO modes having different digital MIMO precoders (codebooks) over the selected beam pairs, selects at least one MIMO mode having the largest channel capacity (or satisfying a given condition), selects a preferred PMI (precoder or codebook) for digital beamforming of the selected beam pairs, and estimates CSI (CSI, CQI, CINR, RSSI or MCS level), thereby determining a configuration needed for digital beamforming in step 816.

In an alternative exemplary embodiment, after receiving the feedback information in step 806, the BS may proceed directly to step 816 without requesting feedback information for additional beam selection and digital beamforming. In this case, the MS completes beam selection for analog beamforming and estimation and configuration selection for digital beamforming.

In another exemplary embodiment, the BS may request feedback information for both analog beamforming and for digital precoding in step 804, may receive the feedback information such as an RF chain or antenna arrays, analog beams of each of one or more selected RF chains or antenna arrays, a codebook/PMI and a MIMO rank for digital precoding by which one or more selected Tx analog beams are combined prior to transmission in step 806, and may proceed directly to step 816.

Figure 9:
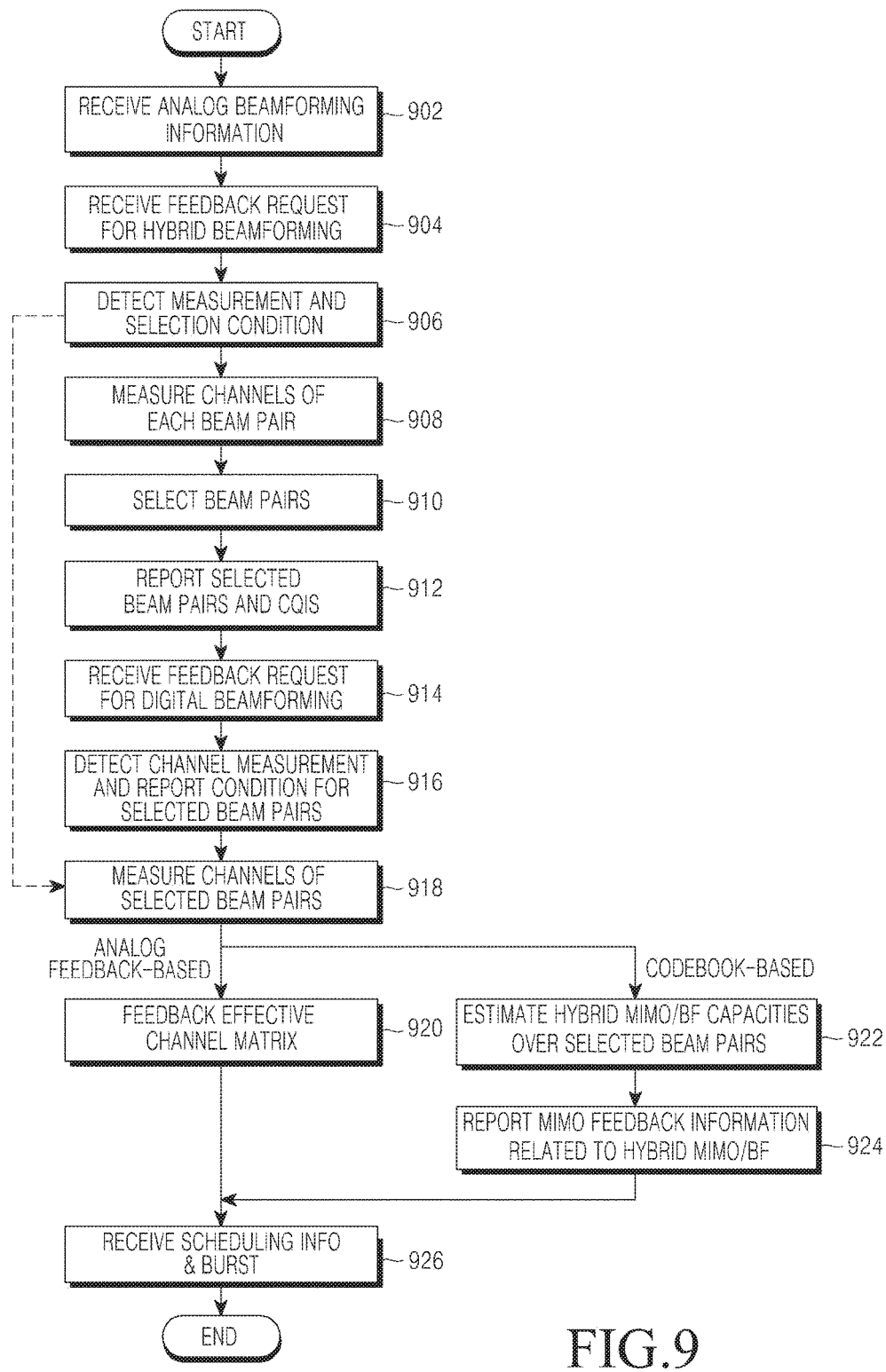
FIG. 9 is a flowchart illustrating a measurement and feedback procedure for hybrid MIMO/BF according to an exemplary embodiment of the present invention.

FIG. 9 is a flowchart illustrating a measurement and feedback procedure for hybrid MIMO/BF according to an exemplary embodiment of the present invention.

Referring to FIG. 9, the MS receives beamforming information from the BS on a broadcast channel or a unicast channel in step 902. The beamforming information includes at least one of analog beamforming information and digital beamforming information. For example, the analog beamforming information specifies the number of BS RF chains, the number of BS antenna arrays, the number of BS Tx beams per BS RF chain or antenna array, and the configuration of reference signals per BS Tx beam.

The MS receives a feedback request for hybrid beamforming, particularly analog beamforming from the BS in step 904 and detects a measurement/selection condition included in the feedback request in step 906. The measurement/selection condition may include at least one of the (maximum) number of available BS RF chains or antenna arrays, the (maximum) number of available BS Tx beams, the (maximum) number of available beam pairs, the (maximum) number of BS Tx beams per MS Rx beam, the (maximum) number of MS Rx beams, the (maximum) number of MIMO streams, a channel quality condition of selecting BS Tx beams or BS Tx-MS Rx beam pairs, and a criterion for a specific MIMO mode.

The MS measures the channel qualities of BS Tx-MS Rx beam pairs (or BS Tx beams) according to the measurement/selection condition set by the BS in step 908 and selects one or more beam pairs (or BS Tx beams) based on the measurements in step 910.

Now a description will be given of an exemplary embodiment of selecting a beam pair in the MS.

Equation (2) expresses a channel matrix measured by the MS in step 908.

$$\overline{H} = \begin{bmatrix} v_1^* H\omega_1 & \cdots & v_1^* H\omega_{N_T} \\ \vdots & \ddots & \vdots \\ v_{N_R}^* H\omega_1 & \cdots & v_{N_R}^* H\omega_{N_T} \end{bmatrix}_{N_R \times N_T}$$ Equation (2)

In Equation (2), $\overline{H}$ represents an estimated $N_T \times N_R$ channel matrix corresponding to $N_t$ BS Tx beams and NR MS Rx beams, $v^*_i$ represents a beam weight for an $i^{th}$ MS Rx beam, $\omega_j$ represents a beam weight for a $j^{th}$ BS Tx beam, and H represents a channel value between a BS Tx antenna and an MS Rx antenna.

A pair of the $i^{th}$ MS Rx beam and the $j^{th}$ BS Tx beam having a channel element that satisfies the condition of Equation (3) or Equation (4) is selected in step 910.

$$CINR_{ij} = \frac{\overline{H}_{ij}^* \overline{H}_{ij}}{\sigma_2} = \frac{\omega_j^* H^* v_i v_i^* H \omega_j}{\sigma^2} \geq CINR_{Th} \quad \text{Equation (3)}$$

$$|CINR_{ij} - CINR_{max}| \leq \Delta CINR_{Th}$$

$$RSSI_{ij} = \overline{H}_{ij}^* \overline{H}_{ij} = \omega_j^* H^* v_i v_i^* H \omega_j \geq RSSI_{Th} \quad \text{Equation (4)}$$

$$|RSSI_{ij} - RSSI_{max}| \leq \Delta RSSI_{Th}$$

In Equations (3) and (4), $\overline{H}_{ij} = v^*_i H \omega_j$ represents a channel value between the $i^{th}$ MS Rx beam and the $j^{th}$ BS Tx beam, $\sigma^2$ represents an Additive White Gaussian Noise (AWGN) variance, $CINR_{ij}$ and $RSSI_{ij}$ represent the CINR and RSSI measurements of a reference signal transmitted by the $j^{th}$ BS Tx beam and received by the $i^{th}$ MS Rx beam, $CINR_{max}$ and $RSSI_{max}$ represent the maximum values of the CINRs and RSSIs of a plurality of beam pairs, $\max_{i,j}(RSSI_{ij})/\max_{i,j}(RSSI_{ij})$, and $CINR_{Th}$ and $RSSI_{Th}$ represent thresholds given by the measurement/selection condition of the BS in step 904. In another exemplary embodiment, a predetermined reference value $CINR_{ref}$ or $RSSI_{ref}$ may be used instead of $CINR_{max}$ or $RSSI_{max}$.

In the above exemplary embodiment of the present invention, the MS selects a BS Tx beam or beam pair having a CINR or RSSI equal to or larger than a predetermined threshold or a BS Tx beam or beam pair having a CINR or RSSI different from the maximum of the CINR or RSSI measurements of a plurality of beam pairs by a predetermined threshold or less.

In another exemplary embodiment, the MS selects a BS Tx beam or beam pair having a standard CINR (or RSSI) deviation equal to or smaller than a predetermined threshold.

$$\text{Std. Dev}(CINR_{ij}(t)) \leq \sigma_{Th}$$

$$\text{Std. Dev}(RSSI_{ij}(t)) \leq \sigma_{RSSI} \quad \text{Equation (5)}$$

In another exemplary embodiment, the MS calculates the correlations between beam pairs and selects beam pairs having a correlation equal to or smaller than a correlation threshold set by the BS.

$$E\{h^*_{ij} h_{mn}\} \leq \rho_{Th} \quad \text{Equation (6)}$$

According to Equation (6), the MS may select a pair of an $i^{th}$ MS Rx beam and a $j^{th}$ BS Tx beam and a pair of an $n^{th}$ MS Rx beam and an $n^{th}$ BS Tx beam.

In another exemplary embodiment, the beam selection condition may be given by the BS or set by the MS.

In step 912, the MS feeds back information about the selected one or more beam pairs and the CSI (e.g., RSSIs, CINRs, etc.) of the beam pairs to the BS. The MS receives a request message requesting feedback information for digital beamforming of the selected one or more beam pairs from the BS in step 914. The request message may include information about one or more beam pairs selected by the BS. The request message may further include digital beamforming information. Herein, the digital beamforming information includes a channel measurement and feedback report condition for the selected beam pairs. For example, the channel measurement and feedback report condition specifies, for example, the maximum number of BS RF paths allocated to the MS, the maximum number of MIMO streams, and feedback information needed for analog/digital/hybrid MIMO/BF.

In step 916, the MS determines the beam pairs selected by the BS from the request message and detects the channel measurement and feedback report condition for the selected beam pairs. The MS measures the channels of the selected beam pairs according to the channel measurement and feedback report condition in step 918. Equation (7) below expresses an effective channel matrix measured for the selected BS Tx-MS Rx beam pairs by the MS.

$$\overline{H}_{eff} = \begin{bmatrix} \overline{v}_1^* H \overline{\omega}_1 & \cdots & \overline{v}_1^* H \overline{\omega}_N \\ \vdots & \ddots & \vdots \\ \overline{v}_M^* H \overline{\omega}_1 & \cdots & \overline{v}_M^* H \overline{\omega}_N \end{bmatrix}_{M \times N (M \leq N_R, N \leq N_T)} \quad \text{Equation (7)}$$

In Equation (7), M and N represent the number of MS Rx beams and the number of BS Tx beams for use in communication, respectively and $\overline{v}_i$ and $\overline{\omega}_j$ represent a weight for a selected $i^{th}$ MS Rx beam and a weight for a selected $j^{th}$ BS Tx beam, respectively.

Subsequently, step 920 or step 922 is performed depending on whether beamforming is performed based on a codebook or an analog feedback between the BS and the MS. The type of digital beamforming to be used may be determined in various manners including negotiations between the BS and the MS, an indication from the BS, a request from the MS, the capabilities of the BS and the MS, and a system standard.

In step 920, the MS transmits feedback information representing the measured effective channel matrix to the BS. For example, the feedback information includes one of the effective channel matrix, a normalized effective channel matrix, a decomposed effective channel matrix, a covariance matrix $\overline{H}_{eff} \overline{H}^*_{eff}$ of the effective channel matrix, the elements of the effective channel matrix, and information needed to reconfigure the effective channel matrix.

In step 922, the MS estimates the hybrid beamforming MIMO/BF channel capacities of the selected beam pairs based on the effective channel matrix and determines a necessary digital beamforming configuration. More specifically, the MS selects a MIMO mode, the number of MIMO streams, and a preferred PMI, and estimates a CQI. The MIMO mode may be one of MIMO Tx diversity, MIMO-BF, MIMO-SM, and MIMO-STC. The estimated CQI may be at least one of a CINR, an RSSI, an effective CINR, and an MCS level. In step 924, the MS transmits to the BS feedback information including the determined digital beamforming information, for example, at least one of an optimum MIMO mode, a preferred PMI representing an optimum digital precoder, an optimum codebook, the number of MIMO streams, an estimated CQI, and an estimated MCS level.

The MS estimates the channel capacities of different MIMO modes having different digital MIMO precoders (codebooks) over the selected beam pairs, selects at least one MIMO mode having the largest channel capacity (or satisfying a given condition), selects a preferred PMI (precoder or codebook) for digital beamforming of the selected beam pairs, and estimates CSI (a CQI, CINR, RSSI or MCS level), thereby generating digital beamforming information in step 922.

In step 926, the MS receives a data burst from the BS using a configuration allocated by scheduling of the BS based on the feedback information reported in step 920 or 924.

In an alternative exemplary embodiment, after selecting the beam pairs in step 910, the MS may proceed directly to step 918 and thus may measure the channels of the beam pairs selected by the MS in step 918. In this case, the MS completes beam selection for analog beamforming.

In another exemplary embodiment, upon request of the BS or autonomously, the MS may select BS RF chains or antenna arrays and BS Tx analog beams or Tx-Rx analog beam pairs to be transmitted through the BS RF chains or antenna arrays and at the same time, the MS may select a MIMO rank and a MIMO precoder/codebook for use in digital MIMO precoding/beamforming through multiple beams.

In the above-described hybrid Tx/Rx beamforming scheme, the number of Tx/Rx beams or Tx-Rx beam pairs to be considered during channel measurement and selection of analog beams is changed depending on the hybrid beamforming structures of the BS and the MS and the maximum number of multiple analog beams that can be used simultaneously during digital precoding is limited by the hybrid beamforming structures of the BS and the MS. Accordingly, the MS and the BS share information about their hybrid beamforming structures or their hybrid beamforming capabilities including the capabilities of analog beamforming and digital beamforming.

Table 1 lists exemplary hybrid beamforming capability fields according to hybrid beamforming structures. The capability fields include at least one of a field indicating support or non-support of analog beamforming for transmission and reception, a field indicating support or non-support of digital MIMO/BF, a field indicating the number of analog Tx/Rx beams in different directions, and a field indicating the number of analog Tx/Rx beams (or the number of Tx/Rx RF paths) supported at the same time.

The hybrid beamforming capability fields may be shared between the BS and the MS by exchanging messages used for capability negotiations during network entry, handover, wake-up from idle state, or network reentry. In another exemplary embodiment, the BS may transmit the hybrid beamforming capability fields on a broadcast message carrying common system information to MSs within the cell or on a unicast message directed to an individual UE. In another exemplary embodiment, the BS may include the hybrid beamforming capability fields in a request message requesting a CSI, CQI or MIMO feedback, transmitted to an individual MS.

As is apparent from the above description, exemplary embodiments of the present invention can mitigate a large propagation loss in a millimeter-wave band and maximize efficiency and diversity by additional use of MIMO/BF by performing an efficiency hybrid beamforming scheme in which one or more best beams are selected from a set of one or more analog beams having directivity on uplink/downlink and digital MIMO/BF is performed in the selected beams during transmission and reception between an MS and a BS in an analog and digital hybrid beamforming structure.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present

TABLE 1

| Category | Description | Value |
| --- | --- | --- |
| Tx Hybrid BF capability (in case of downlink for BS, in case of uplink for MS) | Capability to support Tx analog beamforming | 0b0: non-support<br>0b1: support |
| | Number of separate Tx arrays/subarrays | 0b000: 1~0b111: 8 |
| | Number of Tx analog beamforming-patterns (or beams) per array/subarray | 0b0000: 1~0b11111: 32 analog beam(s) |
| | Capability to support Tx digital MIMO/BF | 0b0: non-support<br>0b1: support |
| | Max number of Tx digital MIMO streams supported | 0b000: 1~0b111: 8 stream(s) |
| | Capability of transmitting concurrently with multiple different Tx analog beams | 0b0: non-support<br>0b1: support |
| | Max number of Tx analog beams supported concurrently (Number of Tx RF chains) | 0b000: 1~0b111: 8 |
| Rx Hybrid BF capability (in case of uplink for BS, in case of downlink for MS) | Capability to support Rx analog beamforming | 0b0: non-support<br>0b1: support |
| | Number of separate Rx arrays/subarrays | 0b000: 1~0b111: 8 |
| | Number of Rx analog beamforming-patterns (or beams) per array/subarray | 0b0000: 1~0b11111: 32 analog beam(s) |
| | Capability to support Rx digital MIMO/BF | 0b0: non-support<br>0b1: support |
| | Max number of Rx digital MIMO streams supported | 0b000: 1~0b111: 8 stream(s) |
| | Capability of receiving concurrently with multiple different Rx analog beams | 0b0: non-support<br>0b1: support |
| | Max number of Rx analog beams supported concurrently (Number of Rx RF chains) | 0b000: 1~0b111: 8 | invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A communication method of a receiver using analog and digital hybrid beamforming, the method comprising:
    receiving, from a transmitter, information about at least one transmission beam selected by the transmitter;
    estimating a channel for the at least one transmission beam selected by the transmitter;
    determining feedback information comprising information on a rank and a precoding for digital beamforming based on the channel estimation result;
    transmitting the feedback information to the transmitter; and
    receiving, from the transmitter, data being scheduled based on the feedback information.

2. The method of claim 1, wherein each of the at least one transmission beam is formed by at least one radio frequency (RF) chain or antenna array selected from among a plurality of RF chains or antenna arrays of the transmitter.

3. The method of claim 1, further comprising:
    transmitting, to the transmitter, report information including first information indicating at least one selected transmission RF chain or antenna array, and second information indicating at least one transmission beam selected for each of the at least one selected transmission RF chain or antenna array.

4. The method of claim 1, wherein the feedback information for digital beamforming comprises information about at least one of one or more transmission RF chains, one or more transmission antenna arrays, a MIMO mode, a MIMO rank, the number of MIMO streams, a MIMO precoder, a MIMO codebook, channel quality information, and a modulation and coding scheme (MCS) level.

5. The method of claim 4, wherein the feedback information for digital beamforming further comprises information about at least one of an effective channel matrix estimated by the channel estimation result, a normalized effective channel matrix, a decomposed effective channel matrix, a covariance matrix of the effective channel matrix, elements of the effective channel matrix, and information required to reconfigure the effective channel matrix.

6. The method of claim 1, further comprising:
    receiving, from the transmitter, a message including information related to measurement for beamforming,
    wherein the message comprises at least one of the number of transmission RF chains to be reported, the number of transmission antenna arrays to be reported, the number of transmission beams per transmission RF chain or transmission antenna array to be reported, the number of transmission beams to be reported, the number of beam pairs to be reported, the number of transmission beams per reception beam to be reported, the number of reception beams to be reported, the number of MIMO streams, a channel quality condition used to select a transmission beam or a pair of a transmission beam and a reception beam, a MIMO mode to be fed back, a supported MIMO rank, and the number of supported MIMO streams.

7. The method of claim 1, further comprising:
    selecting a transmission beam having a signal to interference and noise ratio (SINR) or signal strength equal to or larger than a threshold from among the plurality of transmission beams;
    selecting a transmission beam having an SINR or signal strength different from a predetermined reference value by a given relative threshold from among the plurality of transmission beams;
    selecting a transmission beam having an SINR standard deviation or signal strength standard deviation equal to or larger than a threshold from among the plurality of transmission beams; and
    selecting a pair of transmission beams having a correlation equal to or larger than a threshold from among the plurality of transmission beams.

8. The method of claim 1, wherein the determining of the feedback information for digital beamforming comprises:
    determining an effective channel matrix based on a selected transmission RF chain or antenna array and a transmission beam corresponding to the selected transmission RF chain or antenna array;
    selecting a precoder or codebook that maximizes a signal to noise ratio (SNR) of each MIMO stream or a channel capacity, estimated with respect to a supported MIMO rank or the number of supported MIMO streams;
    estimating an effective carrier to interference and noise ratio (CINR) according to the selected precoder or codebook; and
    generating the feedback information for digital beamforming with information about at least one of the selected precoder or codebook and the effective CINR.

9. A communication method of a transmitter using analog and digital hybrid beamforming, the method comprising:
    determining at least one transmission beam for a receiver;
    transmitting, to the receiver, information about the at least one transmission beam for the receiver;
    receiving, from the receiver, feedback information comprising information on a rank and a precoding for digital beamforming, the feedback information being determined based on a channel estimation result on the at least one selected transmission beam for the receiver; and
    transmitting, to the receiver, data being scheduled based on the feedback information.

10. The method of claim 9, wherein each of the at least one transmission beam is formed by at least one radio frequency (RF) chain or antenna array selected from among a plurality of RF chains or antenna arrays of the transmitter.

11. The method of claim 9, further comprising:
    receiving, from the receiver, report information including first information indicating at least one selected transmission RF chain or antenna array, and second information indicating at least one transmission beam selected for each of the at least one selected transmission RF chain or antenna array.

12. The method of claim 9, wherein the feedback information for digital beamforming comprises information about at least one of one or more transmission RF chains, one or more transmission antenna arrays, a MIMO mode, a MIMO rank, the number of MIMO streams, a MIMO precoder, a MIMO codebook, channel quality information, and a modulation and coding scheme (MCS) level.

13. The method of claim 12, wherein the feedback information for digital beamforming further comprises information about at least one of an effective channel matrix estimated by the channel estimation result, a normalized effective channel matrix, a decomposed effective channel matrix, a covariance matrix of the effective channel matrix, elements of the effective channel matrix, and information required to reconfigure the effective channel matrix.

14. The method of claim 9, further comprising:
transmitting, to the receiver, a message including information related to measurement for beamforming,
wherein the message includes at least one of the number of transmission RF chains to be reported, the number of transmission antenna arrays to be reported, the number of transmission beams per transmission RF chain or transmission antenna array to be reported, the number of transmission beams to be reported, the number of beam pairs to be reported, the number of transmission beams per reception beam to be reported, the number of reception beams to be reported, the number of MIMO streams, a channel quality condition used to select a transmission beam or a pair of a transmission beam and a reception beam, a MIMO mode to be fed back, a supported MIMO rank, and the number of supported MIMO streams.

15. A mobile station (MS) for performing communication using analog and digital hybrid beamforming, the MS comprising:
a transceiver; and
at least one processor configured to control digital beamforming and analog beamforming of the transceiver,
wherein the at least one processor is configured to:
receive, from a transmitter, information about at least one transmission beam selected by the transmitter,
estimate a channel for the at least one transmission beam selected by the transmitter,
determine feedback information comprising information on a rank and a precoding for digital beamforming based on the channel estimation result,
transmit, to the transmitter, the feedback information, and
receive, from the transmitter, data being scheduled based on the feedback information.

16. The mobile station of claim 15, wherein each of the at least one transmission beam is formed by at least one radio frequency (RF) chain or antenna array selected from among a plurality of RF chains or antenna arrays of the transmitter.

17. The mobile station of claim 15, wherein the at least one processor is further configured to transmit, to the transmitter, report information including first information indicating at least one selected transmission RF chain or antenna array, and second information indicating at least one transmission beam selected for each of the at least one selected transmission RF chain or antenna array.

18. The mobile station of claim 15, wherein the feedback information for digital beamforming comprises information about at least one of one or more transmission RF chains, one or more transmission antenna arrays, a MIMO mode, a MIMO rank, the number of MIMO streams, a MIMO precoder, a MIMO codebook, channel quality information, and a modulation and coding scheme (MCS) level.

19. A base station (BS) for performing communication using analog and digital hybrid beamforming, the BS comprising:
a transceiver; and
at least one processor configured to control digital beamforming and analog beamforming of the transceiver,
wherein the at least one processor is configured to:
determine at least one transmission beam for a receiver,
transmit, to the receiver, information about the at least one transmission beam,
receive, from the receiver, feedback information comprising information on a rank and a precoding for digital beamforming, the feedback information being determined based on a channel estimation result on the at least one selected transmission beam, and
transmit data being scheduled based on the feedback information.

20. The base station of claim 19, wherein each of the at least one transmission beam is formed by at least one radio frequency (RF) chain or antenna array selected from among a plurality of RF chains or antenna arrays of the transmitter.

21. The base station of claim 19, wherein the at least one processor is further configured to receive, from the receiver, report information including first information indicating at least one selected transmission RF chain or antenna array, and second information indicating at least one transmission beam selected for each of the at least one selected transmission RF chain or antenna array.

22. The base station of claim 19, wherein the feedback information for digital beamforming comprises information about at least one of one or more transmission RF chains, one or more transmission antenna arrays, a MIMO mode, a MIMO rank, the number of MIMO streams, a MIMO precoder, a MIMO codebook, channel quality information, and a modulation and coding scheme (MCS) level.

* * * * *